United States Patent
Barrere et al.

[11] Patent Number: 5,857,746
[45] Date of Patent: Jan. 12, 1999

[54] ARTICULATION FOR A SEAT, AND SEAT FOR A MOTOR VEHICLE EQUIPPED WITH THIS ARTICULATION

[75] Inventors: Eric Barrere; Olivier Delatte; François Fourrey; Jean Marie Blanchard; Michel di Luccio, all of Nogent-sur-Vernisson, France

[73] Assignee: CESA - Compagnie Europeene de Seiges pour Automobiles, Levallois-Perret, France

[21] Appl. No.: 52,027

[22] Filed: Mar. 31, 1998

Related U.S. Application Data

[62] Division of Ser. No. 733,066, Oct. 16, 1996, Pat. No. 5,769,494.

[30]  Foreign Application Priority Data

Oct. 17, 1995 [FR] France .................................. 95 12 159

[51] Int. Cl.⁶ ............................................. B60N 2/02
[52] U.S. Cl. ...................................... 297/367; 297/378.12
[58] Field of Search .................................. 297/367, 366, 297/354.12, 353, 354.1, 368, 369, 378.1, 378.12

[56]  References Cited

U.S. PATENT DOCUMENTS

| 4,076,309 | 2/1978 | Chekirda et al. . |
|---|---|---|
| 4,082,352 | 4/1978 | Bales et al. . |
| 4,997,223 | 3/1991 | Croft . |
| 5,161,856 | 11/1992 | Nishino . |
| 5,590,931 | 1/1997 | Fourrey et al. . |
| 5,611,599 | 3/1997 | Baloche et al. . |
| 5,622,407 | 4/1997 | Yamada et al. . |

FOREIGN PATENT DOCUMENTS

| 24976 | 3/1981 | European Pat. Off. . |
|---|---|---|
| 691238 | 6/1995 | European Pat. Off. . |
| 2494574 | 5/1982 | France . |
| 2626154 | 7/1989 | France . |
| 2241884 | 9/1991 | United Kingdom . |

*Primary Examiner*—Milton Nelson, Jr.
*Attorney, Agent, or Firm*—Sughrue, Mion, Zinn, Macpeak & Seas, PLLC

[57]  ABSTRACT

An articulation has two cheeks 24, 26, intended to be fixed to a seat part and a backrest of the seat. The cheeks can rotate with respect to each other about an axis X. The articulation also includes structure 30 for coupling the cheeks together, which are actuated by two rings 42a, 42b centered substantially on the axis. The rings can be moved in two opposite directions for respectively adjusting the inclination of and for folding down the backrest, between a first position in which at least one coupling member 34a, 34b is secured to the first and to the second cheek respectively, and a second position in which the coupling member is released. The rings each comprise a stud 48a, 48b formed on their interior contour, and a spring 50 hooked onto the studs to elastically return the rings in opposite directions, into their first position.

9 Claims, 5 Drawing Sheets

FIG. 11

ARTICULATION FOR A SEAT, AND SEAT FOR A MOTOR VEHICLE EQUIPPED WITH THIS ARTICULATION

This application is a divisional of Ser. No. 8/733,066 filed Oct. 16, 1996 now U.S. Pat. No. 5,769,494.

BACKGROUND OF THE INVENTION

The present invention relates to an articulation for a seat and to a seat for a motor vehicle equipped with this articulation.

Already known in the state of the art is an articulation for a seat, especially for a motor vehicle, of the type comprising:

two cheeks intended to be fixed, respectively, to a seat part and to a backrest of the seat, these cheeks being able to rotate one with respect to the other about an axis of articulation which is perpendicular to them, means for coupling the cheeks together, these means being actuated by two operating members mounted so that they can rotate about the axis of articulation, movable in two opposite directions for respectively adjusting the inclination of and for folding down the backrest, between a first position in which at least one coupling member is secured respectively to the first and to the second cheek, and a second position in which this coupling member is released, and means for elastically returning the operating members to the their first position.

In the case of a motor vehicle front seat equipped with an articulation of this type, commonly known as a memory articulation, it is possible to fold the backrest down onto the seat part in order to access the rear seats of the vehicle, and to raise this backrest up to a position of use, and to do this without altering the backrest inclination adjustment.

The object of the invention is to provide a compact and robust articulation, especially having a smaller number of components so as to avoid the appearance of undesirable play resulting from wearing of the articulation.

To this end, the subject of the invention is an articulation for a seat, especially for a motor vehicle, of the aforementioned type, characterized in that the operating members consist of two rings centred approximately on the axis of articulation and each comprising a stud formed on their interior contour, the return means comprising a spring with an angular effect hooked onto the studs in such a way as to urge the rings in opposite directions.

According to other features of the invention:

the spring consists of a split ring, the axial edges of which are hooked into the studs;

the spring plays a part in centring the rings;

the articulation comprises a member for controlling the coupling means, mounted so that it can rotate about the axis of articulation, equipped with a cam interposed between the two studs, this cam being intended to interact selectively with these two studs, which form cam followers, by rotation in the directions for adjusting the inclination of the backrest and for temporarily folding this backrest down;

the cam is interposed between the two studs with an angular clearance on either side of this cam;

the cheeks and the rings are centred with respect to each other by complementary circular shoulders made in these elements, substantially coaxial with the axis of articulation;

the cheeks are secured to a corresponding end of a coupling member by interaction of complementary shapes in particular comprising complementary toothings;

the coupling member consists of a lever which can pivot about a fulcrum which, when this lever is secured to a cheek is stationary with respect to this same cheek.

Another subject of the invention is a seat for a vehicle equipped with at least one articulation as defined hereinabove.

BRIEF DESCRIPTION OF THE DRAWING

The invention will be better understood from reading the description which will follow, given solely by way of example and made with reference to the attached drawings in which.

DETAILED DESCRIPTION OF THE PREFERRED EMBODIMENTS

Figure 1:
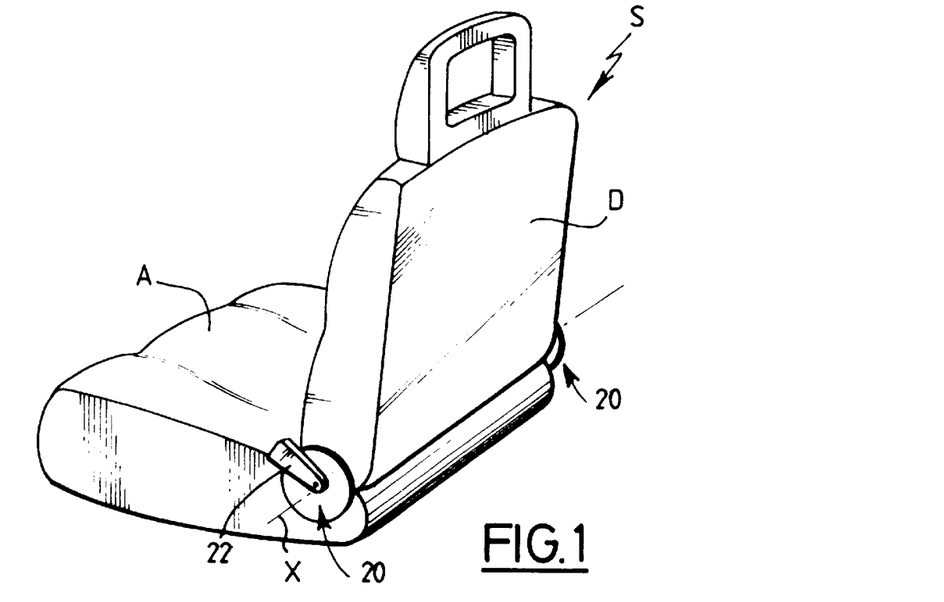
FIG. 1 is a view in perspective of a seat for a motor vehicle equipped with at least one articulation according to the invention.

FIG. 1 represents a seat S for a motor vehicle including a backrest D connected to a seat part A by two articulations 20 according to the invention.

Each articulation 20 is the mirror image of the other articulation.

The articulations 20 are preferably controlled by a knob 22 common to these two articulations.

Figure 2:
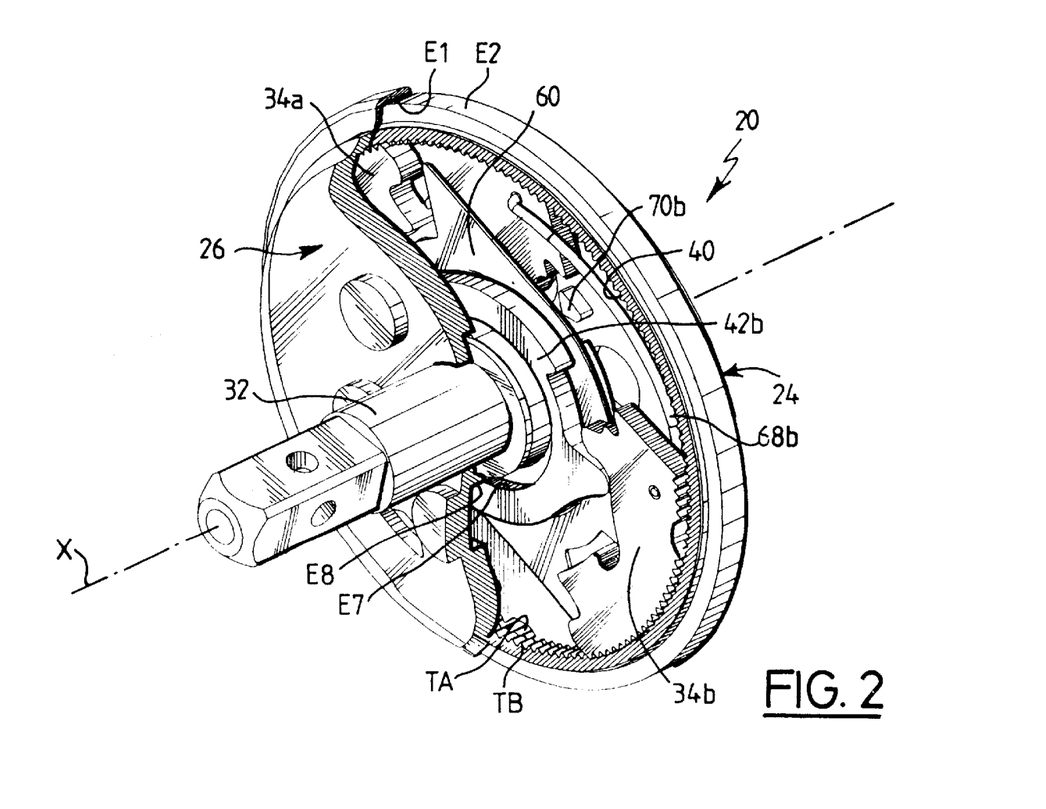
FIG. 2 is a view in perspective of an articulation for a seat according to a first embodiment of the invention.
Figure 3:
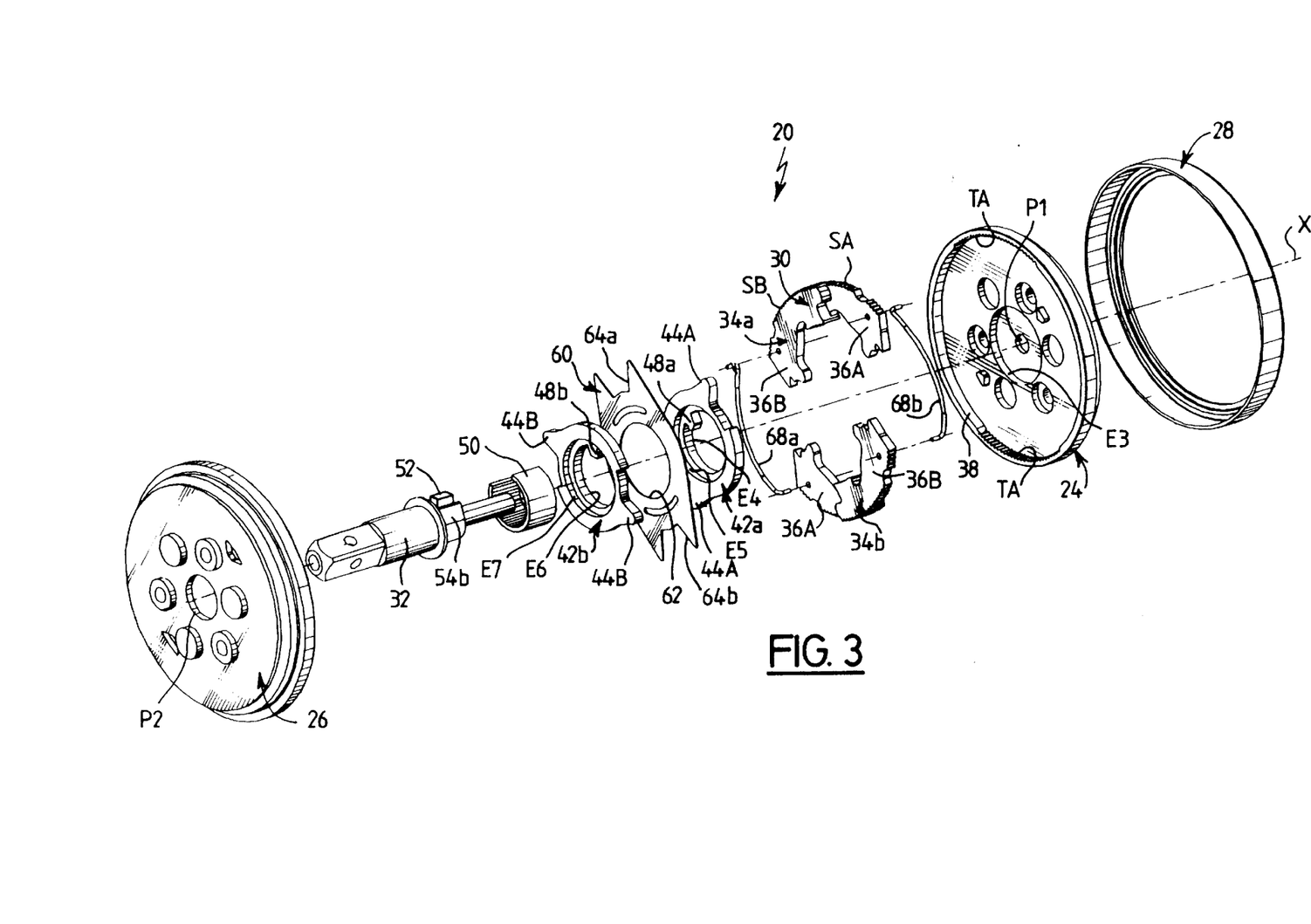
FIG. 3 is an exploded view of the articulation represented in FIG. 2.

Referring especially to FIGS. 2 and 3, in which an articulation 20 is represented in greater detail, it may be seen that this articulation includes two cheeks 24, 26 of circular overall shape, one, which is stationary, being fixed to the seat part A and the other, which is mobile, being fixed to the backrest D.

The cheeks 24, 26 are mounted so that they can rotate one with respect to the other about an axis of articulation X which is perpendicular to them, and are held against one another in a way known per se by means of a connecting ring 28.

The cheeks 24, 26 are centred one with respect to the other by complementary peripheral shoulders E1, E2 coaxial with the axis of articulation X.

The cheeks 24, 26 delimit between them a housing for means 30 of coupling these cheeks. These means 30 are controlled by a member 32 forming a spindle on which the control knob 22 is fixed in a way known per se.

The control member 32 is mounted so that it can rotate about the axis of articulation X, being borne, for example, by bearings P1, P2 made in the cheeks 24, 26.

The control member 32 can be actuated via the knob 22 in two opposite directions, namely in a clockwise direction for adjusting the inclination of the backrest with respect to the seat part, and an anticlockwise direction for folding this backrest down.

The members 32 for controlling the two articulations 20 are joined together by a conventional coupling device.

The coupling means 30 comprise two levers 34a, 34b in the overall shape of arcs extending substantially parallel to the cheeks 24, 26. These levers 34a, 34b are symmetric with respect to the axis of articulation X and are identical.

Each lever 34a, 34b has two ends 36A, 36B, each of which can be secured directly to an associated cheek 24, 26 by interaction of complementary shapes delimited, for preference, by complementary toothings.

The ends 36A, 36B of each lever 34a, 34b are offset one with respect to the other, parallel to the axis of articulation X.

The ends of the levers each include a toothed sector SA, SB for securing, made on the exterior contour of the levers. As a preference, the toothed sectors SA, SB include a common part in a central region of the levers where thickness is a maximum.

The toothed sectors SA of the first ends 36A of the levers are intended to interact with toothed sectors TA of like angle made on the interior contour of a peripheral shoulder 38 of the stationary cheek 24, visible especially in FIG. 3.

The toothed sectors SB of the second ends 36B of the levers are intended to interact with a toothed sector TB of larger angle made on the interior contour of a peripheral shoulder 40 of the mobile cheek, visible especially in FIG. 2. As a preference, this toothed sector TB forms an annulus gear.

It will be noted that the peripheral shoulders 38, 40 made in the cheeks 24, 26 are offset one with respect to the other parallel to the axis of articulation X.

The control member 32 actuates means of manoeuvring the levers 34a, 34b which will be described hereinbelow. These manoeuvring means are, in general, symmetric with respect to the axis of articulation X.

The manoeuvring means secure each lever 34a, 34b to just one of the cheeks 24, 26 or the other, depending on the direction of rotation of the control member 32, by tilting the lever 34a, 34b about a fulcrum embodied by the complementary toothings of one or other end 36A, 36B of the lever and of its associated cheek 24, 26.

Figure 4:
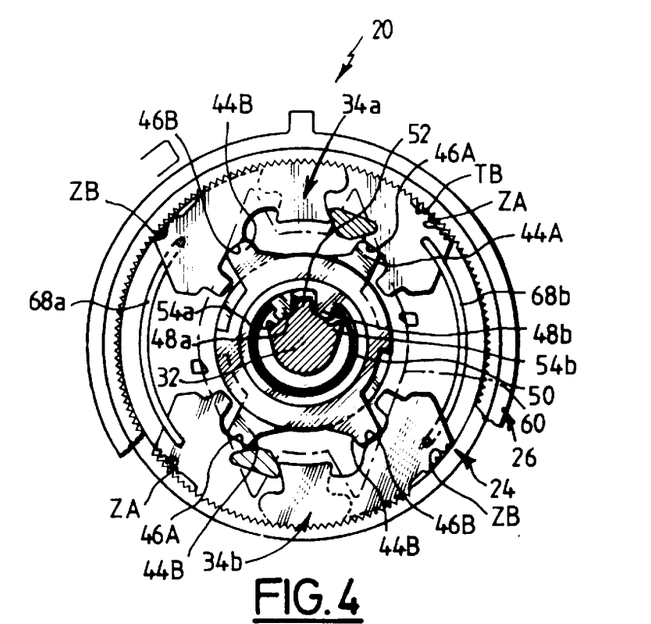
FIG. 4 is a front-on view of the articulation represented in FIG. 2, with the mobile cheek cut away to give visual access to the inside of the articulation.
Figure 6:
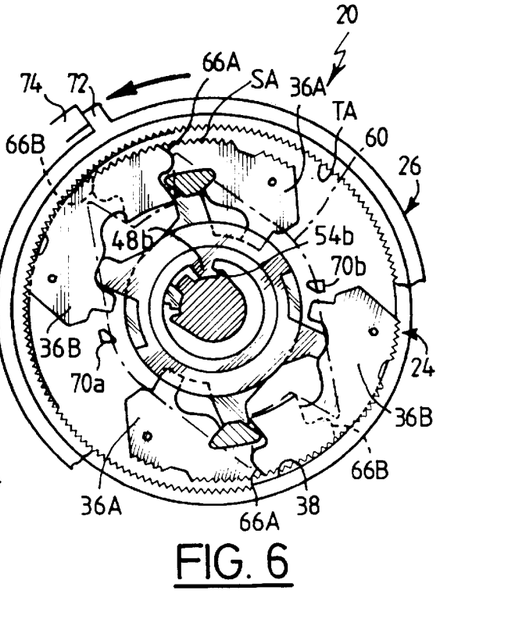
Figure 8:
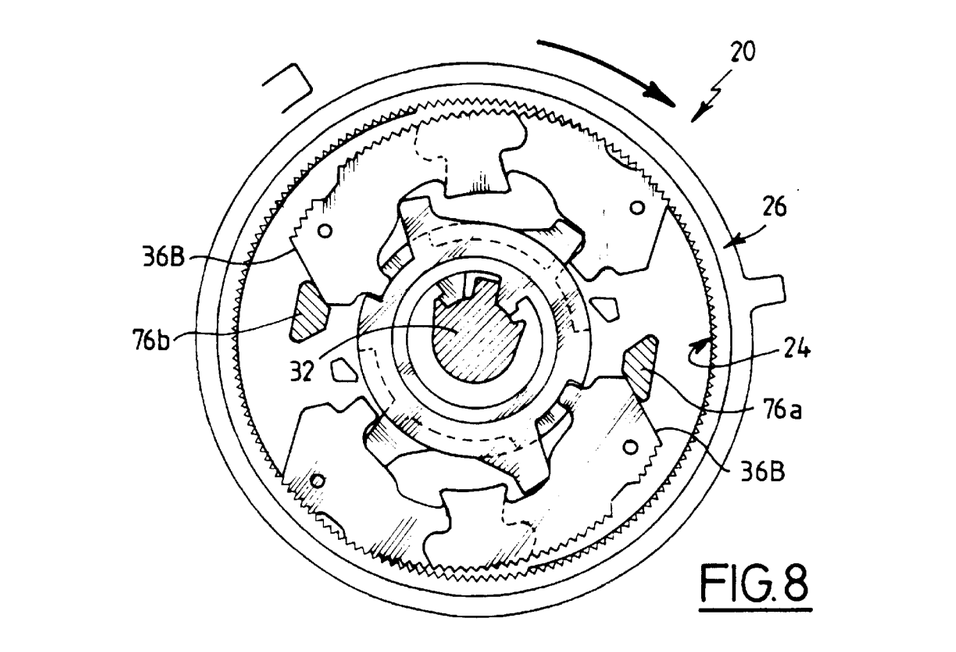

The manoeuvring means comprise means for securing the ends 36A, 36B of the levers to the associated cheeks 24, 26 and means for tilting the levers between a position of rest, as represented in FIG. 4, and two alternative tilted positions, as represented in FIGS. 6 and 8.

When a lever is in the position of rest, the two ends 36A, 36B thereof are meshed in the corresponding toothings of the associated cheeks so as to couple these and thus immobilize the backrest with respect to the seat part.

When a lever 34a, 34b is in one of its alternative tilted positions, one end 36A, 36B of this lever is meshed in the corresponding toothing TA, TB of the associated cheek 24, 26 so as to bear against this toothing, and the other end 36B, 36A of this lever is freed from this same cheek 24, 26 so as to allow, as the case may be, the inclination of the backrest to be adjusted, or the backrest to be folded down temporarily.

The means of securing the ends 36A, 36B of the levers to the associated cheeks 24, 26 comprise two rotary rings 42a, 42b centred. substantially on the axis of articulation X and superposed along this axis.

The cheeks 24, 26 and the rings 42a, 42b are centred with respect to one another, possibly with clearance, by complementary circular shoulders E3 to E8 made in these elements, these being substantially coaxial with the axis of articulation X (see FIGS. 2 and 3).

Each ring 42a, 42b comprises a pair of diametrically opposed bearing cams 44A, 44B, delimited by bosses made on the exterior contour of the ring.

The bearing cams 44A (and 44B respectively) of a first ring 42a (and of the second ring 42b respectively) are associated with first ends 36A of the levers (and the second ends 36B respectively) which is symmetric with respect to the axis of articulation X.

The bearing cams 44A, 44B are intended to interact with bearing cam followers 46A, 46B made on the interior contour of the ends 36A, 36B of the levers, with which ends they are associated in order to keep these ends in mesh with the toothings of the cheeks 24, 26.

The rings 42a, 42b each comprise a stud 48a, 48b made on their interior contour, intended to catch on an angularly-acting return spring 50 urging the rings in opposite directions towards the positions in which the bearing cams and bearing cam followers interact.

The spring 50 consists, for example, of a split ring, the axial edges of which are caught on the studs 48a, 48b.

It will be noted that for reasons of clarity the spring 50 is not represented in FIGS. 5 to 8.

The spring 50 plays a part in centring the rings 42a, 42b and may possibly replace the shoulders E4 to E7 for the centring of these rings.

The means of tilting the levers 34a, 34b comprise means for disengaging the bearing cams associated with the ends to be freed of the levers, opposing the elastic return force of these bearing cams, and means for pushing the bearing ends of the levers.

The means for disengaging the bearing cams comprise a disengaging cam 52 integral with the control member 32, intended to interact selectively with the two studs 48a, 48b forming disengaging cam followers, between which studs this disengaging cam 52 is interposed, preferably with angular clearance on each side of this cam 52.

This angular clearance makes it possible to get around the mechanical tolerances on the device for coupling the control members 32 of the two articulations 20 whilst allowing good synchronization of the coupling and of the uncoupling of the cheeks 24, 26 of the two articulations.

As will emerge more clearly from the description of the operation of the articulation which is given hereafter, the means for pushing a bearing end of a lever comprise, in this first embodiment of the invention, the bearing cam 44A, 44B associated with this bearing end interacting with the bearing cam follower 46A, 46B integral with this same end.

The pushing means also comprise cams 54a, 54b for the offset driving of the rings, these being integral with the control member 32 and extending angularly on each side of the disengaging cam 52 so that each stud 48a, 48b extends between the disengaging cam 52 and a driving cam 54a, 54b with angular clearance.

This angular clearance makes it possible, when the control member 32 is rotated, to have offset driving of a first then of a second stud 48a, 48b thus first of all causing disengagement of the bearing cams 44A, 44B associated with the ends 36A, 36B to be freed of the levers, then causing the bearing ends 36B, 36A of these levers to be pushed.

Each end 36A, 36B of the levers includes a tilt-limiting stop 56A, 56B delimited by an end boss made on the interior contour of this end, and intended to interact with a complementary stop delimited by a cutout 58A, 58B made on the exterior contour of the ring 48a, 48b bearing the bearing cam 44A, 44B associated with the end of the lever.

Thus it will be noted that the complementary stop for limiting the tilting of a lever, associated with one end of this lever, is integral with the bearing cam associated with this end of the lever.

Referring to FIG. 3, it may be seen that a spacing member 60 is interposed between the rings 42a, 42b. This member 60 prevents one ring 42a, 42b from interacting with an end 36A, 36B of the levers with which it is not associated.

The spacing member 60 is made, for example, from a thin metal sheet and has a circular central centring orifice 62 intended to interact with a centring shoulder of one of the rings 42a, 42b.

Figure 5:
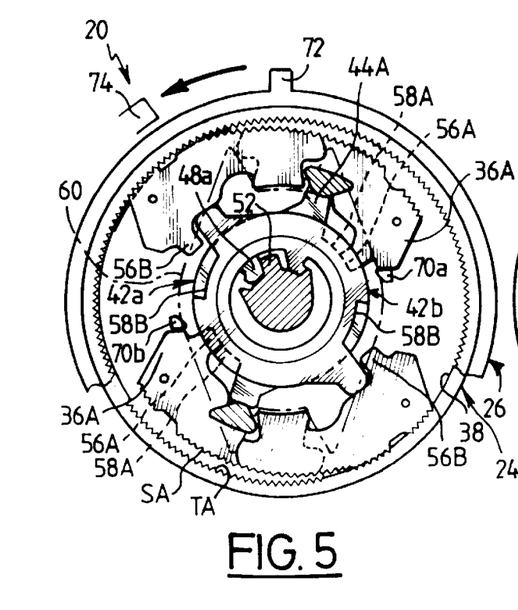
FIGS. 5 and 6 are views which are similar to FIG. 4 in two successive configurations of the articulation during a manoeuvre for temporarily folding the backrest down.
Figure 7:
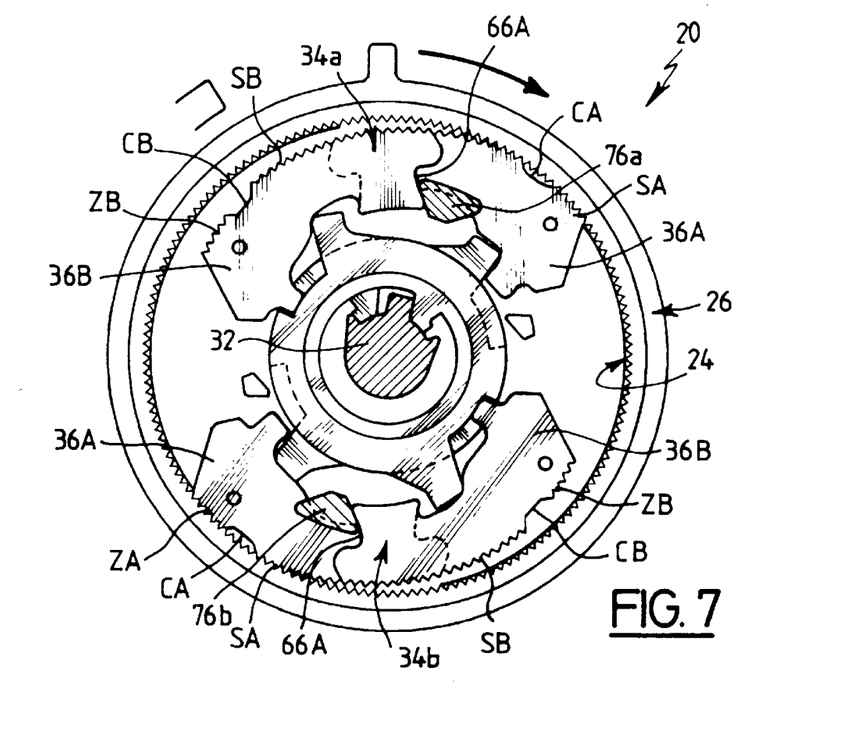
FIGS. 7 and 8 are views similar to FIG. 4, on a slightly enlarged scale, in two successive configurations of the articulation during a manoeuvre for adjusting the inclination of the backrest.

For reasons of clarity, the spacing member 60 is represented in chain line in FIGS. 4 to 6 and is not represented in FIGS. 7 and 8.

The spacing member 60 also forms a member for synchronizing the movement of the levers 34a, 34b and for this purpose comprises two diametrically opposed end forks 64a, 64b which are intended to interact with shoulders 66A, 66B for axially offsetting the ends 36A, 36B of the levers and with the interior contour of these levers when these are tilted (see FIG. 6 especially).

Thus, as the levers 34a, 34b are tilted, each fork 64a, 64b of the member 60 is in three-point contact with the corresponding lever so as to form a non-deformable lever/synchronizing member assembly at that moment.

Referring to FIGS. 3 and 4, it may be seen that the most closely adjacent ends 36A, 36B of the levers are joined together by elastic pins 68a, 68b forming springs, urging these ends into the position for meshing with the associated cheeks 24, 26.

For reasons of clarity, the pins 68a, 68b have not been represented in FIGS. 5 to 8.

The articulation 20 comprises means for limiting the travel for the adjustment of the inclination of the backrest and means for limiting the travel of temporarily folding the backrest down, which means are represented especially in FIGS. 4 to 8.

The means for limiting the travel of temporarily folding the backrest down comprise a first end-of-travel stop 70a, 70b associated with each lever 34a, 34b, integral with the stationary cheek 24 and intended to interact with the ends 36A of the levers intended to mesh with the stationary flange 24 (see especially FIG. 5).

The means for limiting the folding-down travel also comprise a second end-of-travel stop 72 delimited by a boss formed on the exterior contour of the mobile cheek 26 and intended to interact with a complementary end-of-travel stop 74 which is stationary and which is arranged on the outside of the cheeks 24, 26 (see especially FIGS. 5 and 6).

The means for limiting the travel for adjusting the inclination of the backrest comprise two diametrically opposed backrest inclination limit stops 76a, 76b, integral with the mobile cheek 26. Each of these stops 76a, 76b is intended to interact with two complementary end-of-travel stops delimited, in the case of one of them, by a shoulder 66A for axially offsetting the two ends of a first lever 34a, 34b, and in the case of the other, by that end 36B of the second lever 34b, 34a which is intended to mesh with the mobile cheek 26 (see especially FIGS. 7 and 8).

The opposite ends of the two toothed sectors SA, SB of a lever 34a, 34b comprise toothed regions ZA, ZB for reinforcing the bearing of the lever. One or other of these regions ZA, ZB meshes with the toothed sector TA, TB of the associated cheek 24, 26 only when the levers are in one of their two tilted positions or the other (see especially FIGS. 4 and 7).

The bearing reinforcing regions ZA, ZB are separated from the rest of the toothed sectors SA, SB by smooth cutouts CA, CB.

The teeth delimiting the furthest ends of the smooth cutouts CA, CB from the regions ZA, ZB embody, together with complementary teeth of the associated cheeks, fulcrums about which the levers 34a, 34b can tilt.

Of course, the toothed regions ZA, ZB are optional but advantageously reinforce the bearing of the levers 34a, 34b when these are in their tilted positions. The toothed regions ZA, ZB thus play a part in optimizing the robustness of the articulation.

The operation of the articulation 20 will now be described with reference to FIGS. 4 to 8.

In these figures, the stationary cheek 24 is represented behind the mobile cheek 26, the latter being partially cut away.

Initially, the articulation 20 is at rest in the configuration illustrated in FIG. 4.

The levers 34a, 34b are in the position of rest, the spring 50 and the pins 68a, 68b urge the bearing cams 44A, 44B into contact with the cam followers 46A, 46B so that the levers 34a, 34b mesh with the two cheeks 24, 26 at the same time. These cheeks are thus coupled together and the seat backrest is immobilized in the normal position of use.

In order to fold the backrest down temporarily, the knob 22 is actuated so as to drive the control member 32 in the anticlockwise direction represented by an arrow in FIGS. 5 and 6.

The disengaging cam 52 thus drives the lower ring 42a by means of its stud 48a, so as to disengage the bearing cams 44A from the lower ends 36A of the levers. Then the driving cam 54B drives the upper ring 42b via its stud 48b so as to push the upper ends 36B of the levers to bear against the mobile cheek 26, via the bearing cams 44B of the upper ring 42b. The lower ends 36A of the levers are thus freed from the stationary cheek 24 and the upper ends 36B of these levers are secured to the mobile cheek 26.

It will be noted that the moment the lower ends 36A of the levers are freed, these are in contact with the stops 70a, 70b in order to prevent the backrest from moving in the clockwise direction (see FIG. 5).

By continuing to rotate the control member 32 in the clockwise direction, the mobile cheek 26 is driven in the same direction via the upper ring 42b driving the levers coupled only to this mobile cheek.

The backrest can thus be folded down until the articulation 20 is in the configuration represented in FIG. 6 imposed by the complementary stops 72, 74 in mutual contact.

It will be noted that in the configurations of the articulation 20 which are represented in FIGS. 5 and 6, the cams 56A limiting the tilting of the levers are engaged in the cutouts 58A of the lower ring 42a.

In the course of the movement of folding the backrest down, it is possible to let go of the knob 22. The lower ends 36A of the levers are then urged elastically by the spring 50 and the pins 68a, 68b into contact with the interior contour of the peripheral shoulder 38 of the stationary cheek.

However, as this contour is smooth outside of the toothed sectors TA, the toothed sectors SA of the lower ends 36A of the levers slide over this contour and mesh with the stationary cheek 24 only when the backrest has returned to its normal position of use. This is because in this position the complementary toothed sectors SA and TA coincide and can mesh together.

Given that in the course of folding down the backrest the relative position of the levers and of the mobile cheek does not alter, it being possible for the levers to be coupled with the stationary cheek only when they are in a unique position imposed by the toothed sectors TA of this cheek, the adjustment of the backrest with respect to the seat part is unchanged.

In order to adjust the inclination of the backrest with respect to the seat part, the knob 22 is actuated in the opposite direction to the previous case, so as to drive the control member 32 in the clockwise direction represented by an arrow in FIGS. 7 and 8.

In this case, rotating the control member 32 makes it possible, in a way similar to the previous case, to secure the lower ends 36A of the levers to the stationary cheek 24 and to free the upper ends 36B of these levers from the mobile cheek 26.

The mobile cheek 26 can therefore turn freely as may the backrest to which it is fixed which makes it possible to move the backrest to give it the desired inclination. Moving the backrest alters the relative position of the levers and of the mobile cheek.

The backrest is immobilized in the selected position by letting go of the handle 22, which has the effect of returning the articulation 20 to its configuration as represented in FIG. 4 under the effect of the elastic return forces of the spring 50 and of the pins 68a, 68b.

The adjustment on the inclination of the backrest is limited by the two extreme configurations of the articulation 20 which are represented, on the one hand, in FIG. 7 which represents the backrest-inclination limit stops 76a, 76b in contact with the shoulders 66A and on the other hand, in FIG. 8 which represents these same stops 76a, 76b in contact with the upper ends 36B of the levers.

Figure 9:
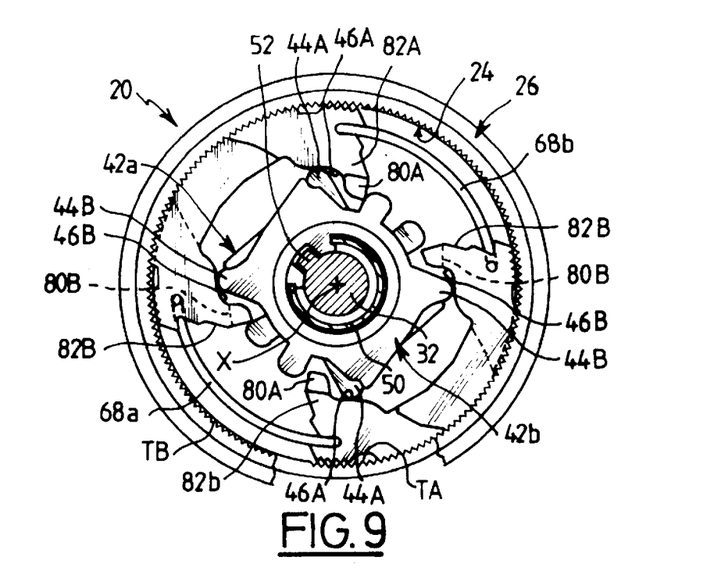
FIG. 9 is a view similar to FIG. 4 of an articulation according to a second embodiment of the invention.
Figure 10:
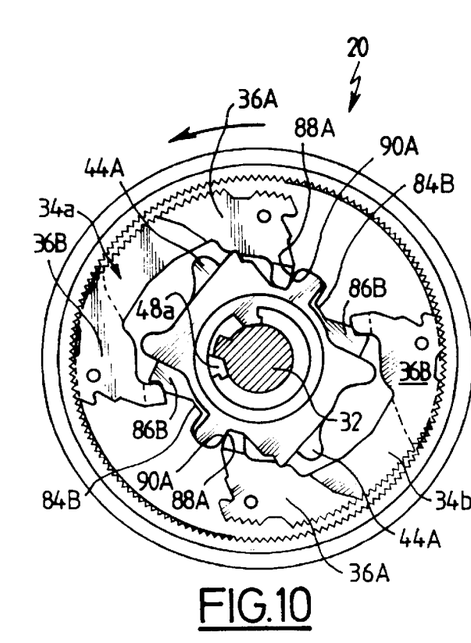
FIGS. 10 and 11 are views which are similar to FIGS. 5 and 7 respectively of the articulation according to the second embodiment.
Figure 11:
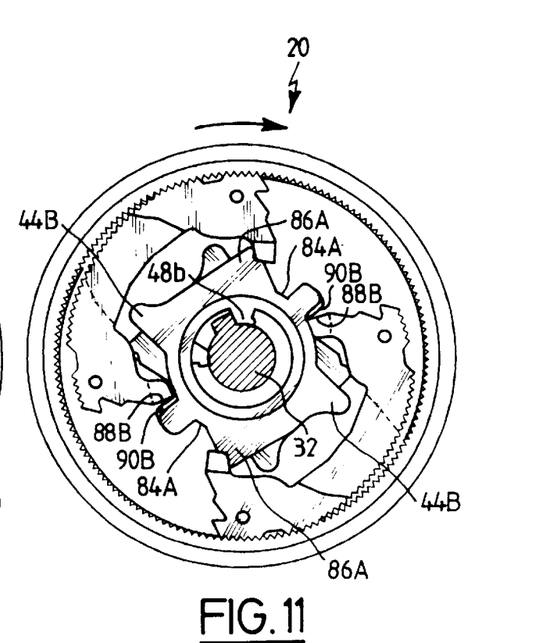

An articulation 20 according to a second embodiment of the invention is represented in FIGS. 9 to 11. In these figures, the elements which are similar to those of the preceding figures are denoted by identical references.

For reasons of clarity, the means for limiting the travel for adjusting the inclination of the backrest and the means for limiting the travel for temporarily folding the backrest down have not been represented in these figures.

For the same reasons, the spring 50 and the pins 68a, 68b are not represented in FIGS. 10 and 11.

In this case, the complementary stop for limiting the tilting of a lever, which is associated with one end of this lever, is integral with the bearing cam associated with the other end of the lever.

In effect, the tilt-limiting stops are delimited by fingers 80A, 80B borne by legs 82A, 82B extending the ends 36A, 36B of the levers substantially radially inwards.

Each finger 80A, 80B extends parallel to the axis of articulation X so as to take up the axial offset between the ends 36A, 36B of the lever bearing it and the other end 36B, 36A of this lever.

The complementary stops for limiting the tilting of the levers are delimited by cutouts 84A, 84B made in the exterior contour of the rings 42a, 42b (see especially FIGS. 10 and 11).

In this second embodiment of the invention, the means for pushing a bearing end 36A, 36B of a lever comprise a pushing cam 86A, 86B delimited by a boss made on the exterior contour of the ring 42b, 42a bearing the bearing cam 44B, 44A associated with the end 36B, 36A to be freed of the lever.

Each pushing cam 86A, 86B is intended to interact with a pushing cam follower delimited by the axial finger 80A, 80B integral with that bearing end of the lever which is associated with the pushing cam.

In order to make it easier to return the levers 42a, 42b to the position of rest from their alternative tilted positions, each end 36A, 36B of a lever includes a cam 88A, 88B for angularly offsetting the bearing cam 44B, 44A associated with the other end 36B, 36A of the lever in the direction for disengaging this bearing cam 44B, 44A.

Each angular-offsetting cam 88A, 88B associated with a first end 36A, 36B of the lever is intended to interact with an angular-offsetting cam follower 90A, 90B integral with the bearing cam 44B, 44A associated with the second end 36B, 36A of the lever, when the first end 36A, 36B of this lever is freed from its associated cheek.

The angular-offsetting cams 88A, 88B are delimited by portions of the contour of the axial fingers 80A, 80B forming ramps, and the angular-offsetting cam followers 90A, 90B are delimited by portions of the contour of the cutouts 84A, 84B limiting the tilting of the levers, forming ramps which complement the previous ones (see especially FIGS. 10 and 11).

It will be noted that the offset-driving cams 54a, 54b integral with the control member 32 are no longer required in the second embodiment of the articulation.

The articulation 20 according to the second embodiment includes a spacing member, not represented, interposed between the rings 42a, 42b.

This spacing member includes, for example, a ring of spring steel sheet having an axial elastic effect making it possible to keep the rings apart while urging them against the respective cheeks.

It will be noted that it is not necessary in this second embodiment of the articulation to provide a member for synchronizing the movement of the levers.

The operation of the articulation 20 according to the second embodiment displays numerous similarities with that of the articulation according to the first embodiment.

However, the following specified differences will be noted by taking, for example, a manoeuvre of temporarily folding the backrest down (see FIG. 10).

When the control member 32 is turned in the anticlockwise direction indicated by an arrow in FIG. 10, the disengaging cam 52 drives the lower ring 42a in this same direction.

The rotation of this ring 42a first of all causes the disengagement of the bearing cams 44A and the freeing of the lower ends 36A of the levers, then causes the cams 86B for pushing of this lower ring to interact with the fingers 80A, 80B of the upper ends 36B of the levers bearing against the mobile cheek 26 in order to tilt the levers.

The mobile cheek can thus turn freely in order to allow the backrest to be folded down, the levers being secured to this cheek.

Freeing the lower ends 36A of the levers causes a slight rotation of the upper ring 42b in the clockwise direction through the interaction of the angular-offsetting ramps 88A associated with these lower ends 36A, with the complementary ramps 90A of the upper ring 42b.

This slight rotation makes it easier for the levers to return to the position of rest.

The operation of the articulation 20 according to the second embodiment in the case of an adjustment of the inclination of the backrest is illustrated in FIG. 11 and can be deduced mutatis mutandis from the operation described earlier for the case of the folding-down of the backrest.

The invention is not limited to the embodiments illustrated in the Figures.

In particular, the seat according to the invention may be equipped with a single articulation like the one described previously.

The articulation according to the invention may have just one lever for coupling the cheeks.

The articulation illustrated in the figures has cheeks equipped with concave internal toothings and levers equipped with convex external toothings. Of course it is possible to produce an articulation having cheeks equipped with convex external toothings and levers equipped with concave internal toothings without departing from the scope of the invention.

The invention has numerous advantages.

In an articulation according to the invention, the loadings are transmitted from one cheek to another directly by the toothed coupling levers, and this reduces the causes of play by comparison with conventional articulations.

If the function of temporarily folding down the backrest is not desired, the articulation according to the invention need be modified only slightly in order to prevent this folding down.

In effect, by filling in a lever-tilt-limiting cutout 58A or 84A of each ring, the tilting of the levers into their position which allows the backrest to be folded down temporarily is prevented.

We claim:

1. An articulation for a seat, especially for a motor vehicle, comprising:

two cheeks (24, 26) intended to be fixed respectively, to a seat part and to a backrest of the seat, these cheeks (24, 26) being able to rotate one with respect to the other about an axis of articulation (X) which is perpendicular to them, means (30) for coupling the cheeks (24, 26) together, these means being actuated by two operating members (42a, 42b) mounted so that they can rotate about the axis of articulation (X), movable in two opposite directions for respectively adjusting the inclination of and for folding down the backrest, between a first position in which at least one coupling member (34a, 34b) is secured respectively to the first and to the second cheek (24, 26), and a second position in which this coupling member (34a, 34b) is released, and means (50) for elastically returning the operating members (42a, 42b) to the their first position, wherein the operating members consist of two rings (42a, 42b) centerd approximately on the axis of articulation (X) and each comprising a stud (48a, 48b) formed on their interior contour, the return means comprising a spring (50) with an angular effect hooked onto the studs (48a, 48b) in such a way as to urge the rings (42a, 42b) in opposite directions.

2. The articulation according to claim 1, wherein the cheeks (24, 26) and the rings (42a, 42b) are centered with respect to each other by complementary circular shoulders (E3 to E8) made in these elements, substantially coaxial with the axis of articulation (X).

3. The articulation according to claim 1, wherein the cheeks (24, 26) are secured to a corresponding end of a coupling member (34a, 34b) by interaction of complementary shapes (SA, SB, TA, TB) in particular comprising complementary toothings.

4. The articulation according to claim 1, wherein the coupling member consists of a lever (34a, 34b) which can pivot about a fulcrum (36A, 36B) which, when this lever is secured to a cheek (24, 26) is stationary with respect to this same cheek (24, 26).

5. A motor vehicle seat comprising at least one articulation (20) according to claim 1.

6. The articulation according to claim 1, wherein the spring (50) consists of a split ring, the axial edges of which are hooked into the studs (48a, 48b).

7. The articulation according to claim 6, wherein the spring (50) plays a part in centering the rings (42a, 42b).

8. The articulation according to claim 1, comprising a member (32) for controlling the coupling means (30), mounted so that it can rotate about the axis of articulation (X), equipped with a cam (52) interposed between the two studs (48a, 48b), this cam (52) being intended to interact selectively with these two studs (48a, 48b), which form cam followers, by rotation in the directions for adjusting the inclination of the backrest and for temporarily folding this backrest down.

9. The articulation according to claim 8, wherein the cam (52) is interposed between the two studs (48a, 48b) with an angular clearance on either side of this cam (52).

* * * * *